Jan. 12, 1954   L. L. CRAWFORD   2,665,822
CONTAINER WITH REMOVABLE COVER AND COVER CLAMPING
MEANS FOR SECURING THE COVER IN PLACE
Filed Nov. 9, 1950   2 Sheets-Sheet 2
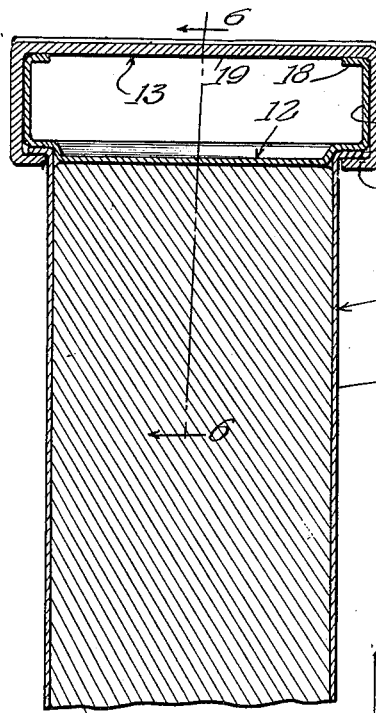
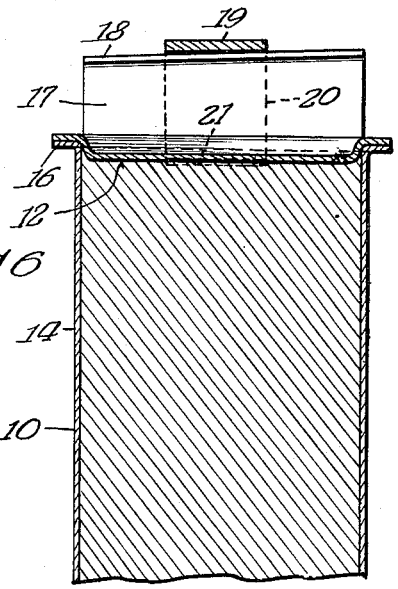
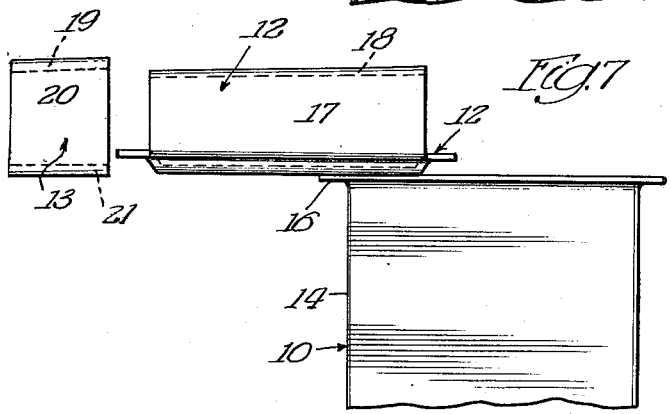
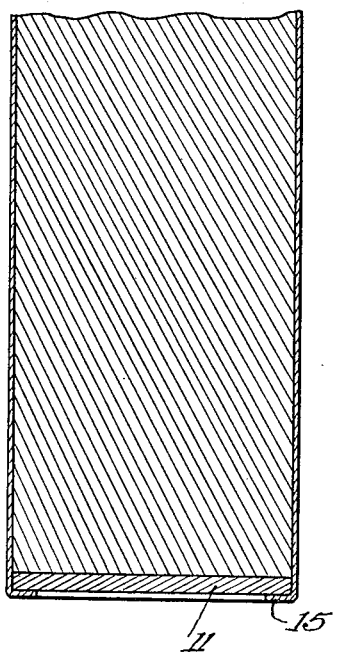
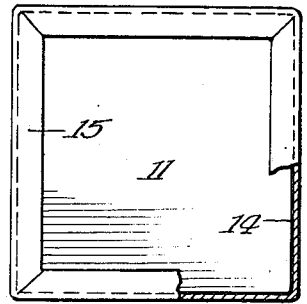
Inventor:
Louis L. Crawford
By Fred Gerlach atty.

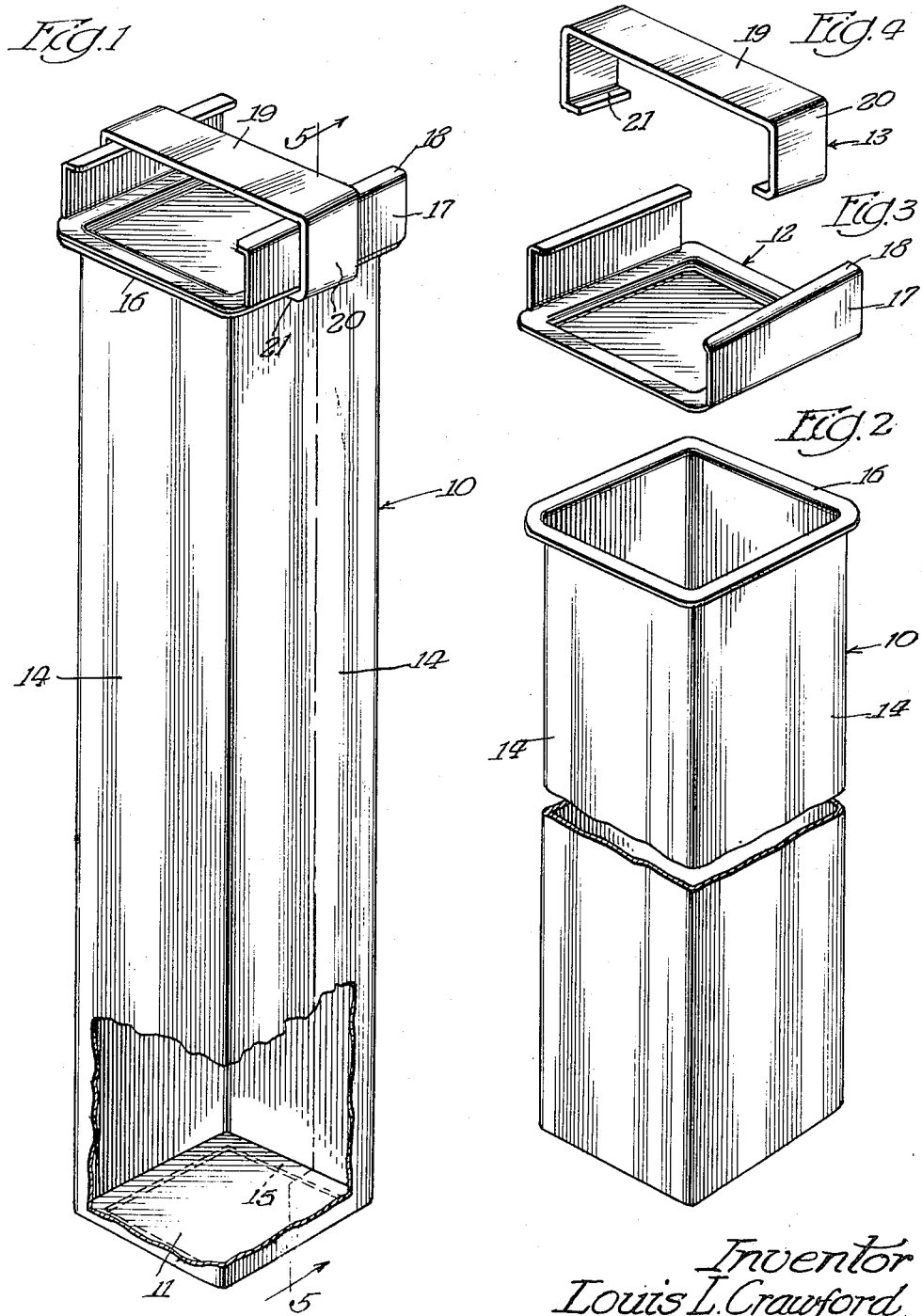

Patented Jan. 12, 1954

2,665,822

UNITED STATES PATENT OFFICE 2,665,822

CONTAINER WITH REMOVABLE COVER AND COVER CLAMPING MEANS FOR SECURING THE COVER IN PLACE

Louis L. Crawford, Western Springs, Ill., assignor to The Allbright-Nell Company, Chicago, Ill., a corporation of Illinois Application November 9, 1950, Serial No. 194,898

3 Claims. (Cl. 220—55)

The present invention relates generally to containers. More particularly the invention relates to that type of container which is adapted to retain and mold or shape a food product, such as ground and mixed sandwich meat, while it is being cooked or otherwise processed and comprises an elongated tubular body having one end thereof open for insertion and removal of the food product and a removable cover for closing the open end of the body during a cooking operation.

One object of the invention is to provide a container of this type which is an improvement upon, and has certain inherent advantages over, previously designed containers and is characterized by the fact that it comprises simple and novel means for releasably clamping the cover in sealed relation with the open end of the elongated tubular body.

Another object of the invention is to provide a container of the type under consideration in which the open end of the body is provided with a continuous outwardly extending rectangular flange, the cover is shaped conformably to, and is adapted to have its marginal portion fit flatly against, the outwardly extending flange on the open end of the body, has the portion thereof within its marginal portion inwardly offset so as to fit snugly within the open end of the body, and embodies on opposite sides of its rectangular marginal portion two spaced apart parallel side members which extend outwards and at right angles to the cover as a whole, and the means for releasably clamping the cover in its operative position comprises a U-shaped member which consists of a crosspiece and a pair of right angle side pieces at the ends of the crosspiece, is adapted after placement of the cover in its operative position to be slid laterally so that it is in straddled relation with the side members on the cover, and is provided at the free ends of its side pieces with inwardly extending straight full width hooks for slidably engaging and gripping the portions of the continuous outwardly extending flange that are adjacent the side members of the cover.

A further object of the invention is to provide a container of the type and character last mentioned in which the side members of the cover are of progressively increasing height from the front ends thereof to the rear ends to the end that they are wedge shaped and the outer margins thereof are inclined forwards at a slight angle with respect to the cover, and the crosspiece of the U-shaped clamping member is correspondingly inclined with respect to the hooks to the end that when the clamping member is slid laterally into place the ends of the crosspiece engage the outer margins of the side members of the cover with a wedge action which results in firm clamping of the marginal portion of the cover against the outwardly extending flange on the open end of the body.

A still further object of the invention is to provide a container of the aforementioned type which is generally of new and improved construction, effectively and efficiently fulfills its intended purpose and is characterized by simplicity of design and low cost of manufacture.

Other objects of the invention and the various advantages and characteristics of the present container will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a perspective showing a container embodying the invention with the cover and U-shaped clamping member in place, parts of the lower end of the container being broken away in order to illustrate the bottom construction of the container;

Figure 2 is a fragmentary perspective of the body of the container;

Figure 3 is a perspective of the cover of the container;

Figure 4 is a perspective of the inverted U-shaped member for releasably clamping the cover in sealed relation with the open upper end of the body;

Figure 5 is a vertical section on the line 5—5 of Figure 1;

Figure 6 is a fragmentary vertical section taken on the line 6—6 of Figure 5 and illustrating in detail the manner in which the inclined crosspiece of the U-shaped clamping member engages the outer margins of the side members of the cover with such a wedge action as firmly to clamp the cover in its operative position;

Figure 7 is a side elevation showing the cover and U-shaped clamping member before they are slid into their operative positions; and Figure 8 is a fragmentary bottom view of the container body.

The container which is shown in the drawings constitutes the preferred form or embodiment of the invention. It is essentially designed for use in the meat packing industry and serves as a medium or instrumentality for retaining and molding or shaping a food product while the latter is being cooked or otherwise processed. Primarily the container is designed for use in connection with processing of ground and mixed sandwich meat. As its components the container comprises an elongated tubular body 10, a bottom 11, a removable cover 12, and a U-shaped member 13 for releasably clamping the cover in place.

The body 10 is preferably square in cross section and comprises four rectangular sides 14, the side margins of which are formed integrally with one another. The sides 14 are formed of sheet or plate metal of such gauge that the body as a whole is rigid while at the same time it is sufficiently light in weight to permit it to be handled with ease and facility. The body 10 is shown in Figure 1 as being vertically positioned. It is to be understood, however, that the body may be placed in any desired position, such, for example, as a horizontal position. The lower end of the body is provided with a continuous inwardly extending flange 15 and the upper end of the body is provided with a continuous outwardly extending flange 16. The flange 15 is formed integrally with, and extends inwards at right angles to, the lower margins of the body sides 14. The flange 16, as best shown in Figure 2, is formed integrally with, and projects outwards at right angles to, the upper margins of the sides 14 of the body 10. Preferably the corner portions of the continuous outwardly extending flange 16 are curved or rounded so as to eliminate sharp points. The flanges 15 and 16 at opposite ends of the body serve to reenforce or strengthen the body against collapse or lateral distortion.

The bottom 11 of the container is in the form of a square sheet metal plate and serves as a closure for the bottom of the tubular body 10. It is shaped conformably to the interior of the body and normally rests on, and is supported by, the continuous inwardly extending flange 15 on the lower margins of the body sides 14. It is contemplated that the body will be filled with the food product to be processed by introducing the product while in a fluid form through the open upper end of the body. It is also contemplated that after the food product has been cooked or otherwise processed so that it is in hardened or semi-hardened form it will be removed from the body by applying such pressure to the bottom 11 that the bottom is caused to slide towards the open upper end of the body. The inwardly extending flange 15 prevents the bottom 11 from moving outwards through the so-called bottom of the body.

The cover 12 serves as a removable closure for the open upper end of the body 10 and is adapted to be utilized after the container body has been charged with the desired amount of food product and while the food product is being processed in the body. It is in the form of a one-piece sheet metal stamping and is shaped conformably to the continuous outwardly extending flange 16 at the upper end of the container body 10. When the cover is in its operative position the marginal portion of the cover registers with, and rests directly on, the flange 16, as shown in Figures 1, 5 and 6. The remaining portion of the cover, i. e., the portion that is inwards of the marginal portion, is struck downwards with respect to the marginal portion and fits snugly within the upper open end of the container body. The cover 12 is provided at opposite sides thereof with flat parallel upwardly extending side members 17. The latter extend at right angles to the cover and have the lower margins thereof formed integrally with adjacent edge parts of the marginal portion of the cover. The upper margins of the side members 17 are bent inwards at right angles to form reenforcing flanges 18. The side members 17 are of gradually increasing height from the front ends thereof to their rear ends and hence they are, in effect, wedge shaped and the inwardly extending flanges 18 are downwardly and forwardly inclined at a small acute angle with respect to the horizontal. By reason of the fact that the cover is square and is shaped conformably or correspondingly to the continuous outwardly extending flange 16 on the open upper end of the container body it may be satisfactorily placed in any one of four different positions on the flange while at the same time it serves as an effective seal or closure for the upper end of the body 10.

The U-shaped clamping member 13, like the cover 12, is in the form of a one-piece metallic casting. It is preferably formed of heavier gauge metal than the cover and consists of a crosspiece 19 and a pair of depending side pieces 20 on the ends of the crosspiece. The side pieces are formed integrally with the ends of, and extend downwards at right angles to, the crosspiece 19. They correspond in height to the central or intermediate portions of the upwardly extending side members 17 of the cover 12 and embody at their lower or free ends integral inwardly extending straight full width hooks 21 for slidably engaging and underlying the parts of the continuous outwardly extending flange 16 that underlie the lower margins of the side members 17, as shown in Figures 1, 5 and 6. The U-shaped clamping member is so shaped or proportioned that when the cover is in its operative or closed position it is adapted to straddle the central portions of the cover side members 17. When the member 13 is in its straddled position the ends of the crosspiece 19 rest on the central portions of the inwardly extending flanges 18, the side pieces 20 lap the central portions of the outer faces of the side members 17 and the inwardly extending hooks 21 on the lower ends of the side pieces underlie and grip the adjacent portions of the continuous outwardly extending flange 16, and hence it serves to hold the cover in its closed position wherein it seals the open upper end of the container body 10. It is contemplated that after the cover has been placed in its closed or operative position the U-shaped clamping member 13 will be slid laterally into its operative position wherein it is in straddled relation with the central portions of the cover side members 17. The crosspiece 19 of the clamping member 13 is forwardly and downwardly inclined in the same manner and to the same extent as the inwardly extending flanges 18 constituting the upper margins of the cover side pieces 17. Because of this the ends of the crosspiece, in connection with lateral sliding of the clamping member into place, engage the central portions of the inwardly extending flanges 18 with a wedge action and hence serve to hold the cover in firmly clamped relation with the continuous outwardly extending flange 16. The crosspiece 19 of the U-shaped clamping member 20 has a twofold purpose in that it serves to hold in place and spaced relation the side pieces 20 and also functions as a handle whereby the container as a whole may be transported from place to place when the cover is clamped in place by the clamping member.

When it is desired to use the container the cover is first removed. Thereafter the bottom 11 is mounted in place on the continuous inwardly extending flange 15 and the container is filled by introducing the food product into the body interior via the open upper end of the body. After filling of the container body to the desired extent the cover 12 is positioned on the open upper end of the container body so that its marginal portion rests on the continuous outwardly extending flange 16. Thereafter the U-shaped clamping member 13 while in an inverted position is positioned directly in front of the front or small ends of the cover side member 17. After so positioning the clamping member the latter is slid rearwards so as to bring it into straddled relation with the side members and cause the hooks to underlie and grip the portions of the flange 16 that underlie the lower margins of the cover side pieces. In connection with rearward sliding movement of the clamping member the ends of the crosspiece 19 slide into engagement with the central portions of the inwardly extending flanges 18 and coact therewith to produce such a wedging action as firmly to clamp and hold the cover in its closed or operative position. When it is desired to remove the cover the clamping member 13 is slid forwards out of straddled relation with the cover side members 17. This results in disengagement of the hooks 21 from the portions of the flange 16 that underlie the lower margins of the cover side members 17 and thus releases the cover so that it may be removed by shifting it forwards relatively to the upper end of the container body.

The herein described container effectively and efficiently fulfills its intended purpose and this is directly attributable to the design and arrangement of the cover and the U-shaped clamping member for the cover. Because of the construction and arrangement of the U-shaped clamping member 13 the cover may be quickly clamped in place and released merely by shifting laterally such member. Furthermore, it is possible securely to clamp the cover in place even though the flange 16 is bent in either direction from its normal position wherein it extends at right angles to the sides of the container body.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a container designed to retain a food product in connection with processing thereof and comprising a tubular body adapted to extend vertically and provided at the upper end thereof with a continuous outwardly extending rectangular flange, a cover shaped conformably to and adapted to have its marginal portion rest on said flange and embodying on opposite sides of its marginal portion two full length parallel upwardly extending side members having the upper margins thereof lying in a plane which is inclined at a comparatively small acute angle with respect to the plane of said marginal portion of the cover, and an inverted U-shaped cover clamping member consisting of a crosspiece and two depending side pieces at the ends of the crosspiece, shaped to extend across and straddle the cover side members, adapted when the cover is in its operative position to be slid laterally into straddled relation with said cover side members, provided on the lower ends of its side pieces with flat inwardly extending hooks for gripping the bottom faces of the flange portions under the side members of the cover and holding the U-shaped member in connected relation with the upper end of the container body, and having its crosspiece inclined in the same manner as the upper margins of the cover side members in order that when the U-shaped member is properly slid into place the ends of said crosspiece engage the upper margins of the cover side members with a wedging action and thus clamp the cover in place.

2. As a new article of manufacture, a container designed to retain a food product in connection with processing thereof and comprising a tubular body adapted to extend vertically and provided at the upper end thereof with a continuous outwardly extending rectangular flange, a cover shaped conformably to and adapted to have its marginal portion rest on said flange and embodying on opposite sides of its marginal portion two full width parallel upwardly extending side members having the upper margins thereof inclined so that they lie in a plane that is at a small acute angle with respect to the plane of said marginal portion of the cover, said upper margins of the side members being provided with inwardly extending full length flanges lying in the first mentioned plane and an inverted U-shaped cover clamping member consisting of a crosspiece and two depending side pieces at the ends of the crosspiece, shaped to extend across and straddle the cover side members, adapted when the cover is in its operative position to be slid laterally into straddled relation with said cover side members, provided on the lower ends of its side pieces with flat inwardly extending hooks for gripping the bottom faces of the flange portions under the side members of the cover and holding the U-shaped member in connected relation with the upper end of the container body, and having its crosspiece inclined in the same manner as the upper margins of said side members in order that when the U-shaped member is properly slid into place the ends of the crosspiece engage the inwardly extending inclined flanges and said upper margins of the cover side members with a wedging action and thus clamp the cover in place.

3. As a new article of manufacture, a container designed to retain a food product in connection with processing thereof and comprising a tubular body of square cross section, adapted to extend vertically and provided at the upper end thereof with a continuous outwardly extending flange, a one-piece stamped metal cover shaped conformably to and adapted to have its marginal portion rest on said flange, having the portion thereof inwards of its marginal portion downwardly offset in order to fit snugly in the upper end of the container body, and embodying on opposite sides of its marginal portion two full length parallel upwardly extending side members having the upper margins thereof inclined in such manner that they lie in a plane that is at a small acute angle with respect to the plane of the marginal portion of the cover, said upper margins of the side members being provided with integral inwardly extending flanges that lie in the first mentioned plane, and a one-piece stamped metal inverted U-shaped cover clamping member consisting of a cross piece and two depending side pieces at the ends of the crosspiece, shaped to extend across and straddle the cover side members, adapted when the cover is in its operative position to be slid laterally into straddled relation with said cover side members, provided on the lower ends of its side pieces with flat full width inwardly extending hooks for gripping the bottom faces of the flange portions under the side members of the cover and holding the U-shaped member in connected relation with the upper end of the container body, and having its crosspiece inclined in the same manner as the upper margins of the cover side members in order that when the U-shaped member is properly slid into place the ends of said crosspiece engage the inwardly extending flanges and said upper margins of the cover side members with a wedging action and thus clamp the cover in place.

LOUIS L. CRAWFORD.

References Cited in the file of this patent

UNITED STATES PATENTS

| Number | Name | Date |
| --- | --- | --- |
| 163,899 | Tilton | June 1, 1875 |
| 568,286 | Waterman | Sept. 22, 1896 |
| 759,336 | Wiley | May 10, 1904 |
| 823,071 | Nelson | June 12, 1906 |
| 1,331,470 | Luckett | Feb. 17, 1920 |
| 2,208,463 | Lloyd | July 16, 1940 |